(12) United States Patent  
Roddis

(10) Patent No.: US 7,789,395 B2
(45) Date of Patent: Sep. 7, 2010

(54) BEARING PROTECTOR

(75) Inventor: Alan James Roddis, Sheffield (GB)

(73) Assignee: AES Engineering Limited, Rotherham (GB)

( * ) Notice: Subject to any disclaimer, the term of this patent is extended or adjusted under 35 U.S.C. 154(b) by 0 days.

(21) Appl. No.: 11/462,590

(22) Filed: Aug. 4, 2006

(65) Prior Publication Data

US 2007/0029736 A1  Feb. 8, 2007

(51) Int. Cl.
*F16J 15/447* (2006.01)
(52) U.S. Cl. .................. 277/418; 277/400; 277/412; 277/421; 277/430
(58) Field of Classification Search .............. 277/371, 277/400, 412, 418, 421, 430, 559
See application file for complete search history.

(56) References Cited

U.S. PATENT DOCUMENTS 4,466,620 A * 8/1984 Orlowski .................... 277/412
4,572,517 A * 2/1986 Rockwood et al. .......... 277/421
4,743,034 A * 5/1988 Kakabaker et al. ......... 277/420
5,024,451 A * 6/1991 Borowski ................... 277/412
5,158,304 A * 10/1992 Orlowski .................... 277/421
5,335,921 A * 8/1994 Orlowski .................... 277/637
5,522,601 A * 6/1996 Murphy ...................... 277/421
6,168,164 B1 * 1/2001 Toth et al. ................... 277/559
6,367,807 B1 * 4/2002 Rockwood .................. 277/412
6,530,573 B1 * 3/2003 Merkin et al. ............... 277/370
6,834,859 B2 * 12/2004 Tones ......................... 277/412
7,121,551 B2 * 10/2006 Dunford et al. ............. 277/349
2002/0063392 A1 * 5/2002 Fedorovich .................. 277/371

* cited by examiner

*Primary Examiner*—Alison K Pickard
(74) *Attorney, Agent, or Firm*—Edwin D. Schindler

(57) ABSTRACT

An isolator device, which may be a bearing seal or a bearing isolator, for use hindering fluid flow between components which are rotating relative to each other about a longitudinal axis, the flow being in one direction parallel to this axis, includes a stator for securing to a rotary fixed one of the components and a rotor for securing to a relatively rotating one of the components. The stator has a surface which extends longitudinally and adjacent to a surface of a component, which rotates relative to the stator. The fluid flow is between the two surfaces and the stator surface is non-parallel to the adjacent component surface and is shaped to promote fluid flow in a direction opposing the general fluid flow direction.

6 Claims, 4 Drawing Sheets

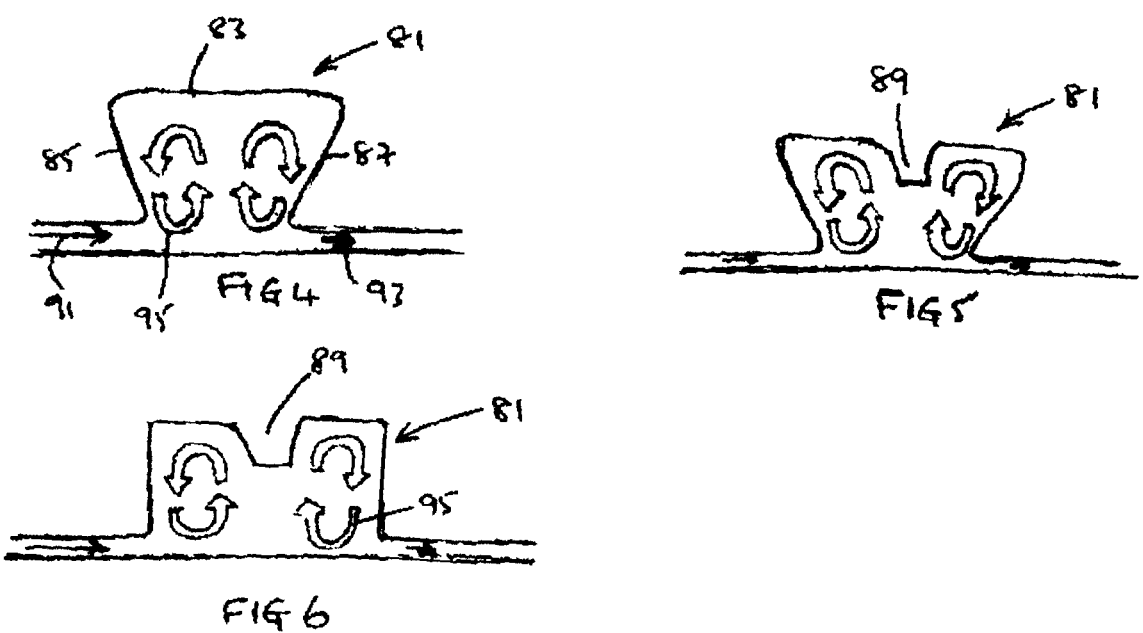

BEARING PROTECTOR

FIELD OF THE INVENTION

This invention relates to bearing protectors and their use in rotating equipment, especially devices, which prevent the ingress or egress of a fluid or solid to a cavity, resulting in deterioration of equipment life. Such devices are also often referred to as bearing seals or bearing isolators. The use of such rotary seals extends beyond the protection of a bearing in rotating equipment. Accordingly, while reference will be made below to bearing protectors, it should be understood that this term is used, as far as the invention is concerned, in connection with such wider uses. More broadly, the term isolator device may be used.

BACKGROUND OF THE INVENTION

The purpose of a bearing protector is to prevent the ingress of fluid, solids and/or debris from entering a bearing chamber. Equally, bearing protectors are employed to prevent the egress of fluid or solids from a bearing chamber. Essentially, their purpose is to prevent the premature failure of the bearing.

Bearing protectors generally fall into two categories: repeller or labyrinth bearing protectors; and mechanical seal bearing protectors. Reference is made to co-pending PCT patent publication No. WO0605950A concerned with labyrinth seal bearing protection and which discloses a substantially non-contacting bearing protector with a static shut off device.

The rotating component typically has a complex outer profile which is located adjacent and in close radial and axial proximity to a complex inner profile of the stationary component. Together these complex profiles, in theory, provide a tortuous path preventing the passage of the unwanted materials or fluids.

In conventional labyrinth devices, the close radial counter rotational members are substantially parallel to each other and run parallel to the centreline of the shaft. Unfortunately, these substantially parallel surfaces have limited effectiveness at discouraging the longitudinal movement of fluid.

STATEMENTS OF THE INVENTION

According to the present invention there is a provided an isolator device for use in hindering fluid flow between components which are rotating relatively to each other about a longitudinal axis, said flow being in one direction parallel to said axis, the device comprising a stator for securing to a relatively fixed one of said components and a rotor for securing to a relatively rotating one of said components, the stator having a surface which extends longitudinally and adjacent to a surface of a component which rotates relative to said stator, the fluid flow being between said surfaces, the stator surface being non-parallel to the adjacent rotating component surface and being shaped to promote fluid flow in a direction opposing said one direction.

Preferably, the surface of the stator forms a least part of a recess within said stator. More preferably, the recess is non-rectangular in longitudinal section.

Typically, the recess will be located adjacent to a shaft of a pump or other rotating equipment. The shaft may be supported by bearings within a bearing housing.

The recess may have a gradually increasing depth in the direction of flow of the fluid (said one direction) and the resultant wedge-shaped longitudinal section of the recess results in fluid movement within the recess which tends to hinder the longitudinal flow in said one direction. Although not limited to any particular fluid movement within the recess, the creation of one or more fluid flow vortices can be envisaged.

Reference is made above to components of the isolator device when the device is in use, that is to say, with relative rotation between the components. It should be appreciated, however, that this is not intended to limit the scope of this invention to a device solely when it is in use but rather to enable the components of the device to be appropriately defined. The invention is directed to the device whether incorporated in rotatable equipment and whether that equipment is in a dynamic situation (in use) or is static. Furthermore, the invention extends to the device separate from, but capable of being installed in, a particular piece of equipment.

The present invention also provides rotating or rotatable equipment incorporating an isolating device of the invention.

Preferably, the gradually increasing depth of the recess is provided by a surface inclined at an angle to the longitudinal axis or from 1° to 45°.

Preferably, the maximum depth of the recess is at or closely adjacent to the upstream end of said recess, that is to say, closer to that end of the device which, in use, is entered by the flowing fluid.

Preferably, the recess is terminated by an end wall extending to the maximum depth of the recess at an angle to the longitudinal axis of from 90° to 45°.

Preferably, a velocity reducing groove is located in said stator adjacent to said recess. More preferably, the velocity reducing groove is situated upstream of the recess.

The recess may, instead of being a substantially wedge-shaped (in longitudinal section) groove, be a three-sided (in longitudinal section) groove have a substantially longitudinally extending base and substantially radially extending end walls. Preferably, each one of said end walls is inclined to the radial plane. More preferably, both of said end walls are inclined to be radial plane.

Preferably, the recess includes a rib extending from said base in a radially inwards directions.

Preferably, at least one of the edges of the recess is rounded. These edges may be the edges between the base and the end wall and/or those at the mouth of (the opening into) the recess.

Preferably, the rib is provided by smoothly curved, radially extending surfaces.

Preferably, the stator is provided with a deformable toroidal member which seals said stator to a relatively fixed one of said components.

Preferably, the rotor is provided with a deformable toroidal member to seal said rotor to a relatively rotatable one of said components.

BRIEF DESCRIPTION OF THE DRAWINGS

The accompanying drawings are as follows:—

FIGS. 4 to 6 show various recesses forming parts of further labyrinth seal bearing protectors of the invention.

DETAILED DESCRIPTION OF THE INVENTION

The invention will now be described, by way of examples only, with reference to the accompanying drawings.

Figure 1:
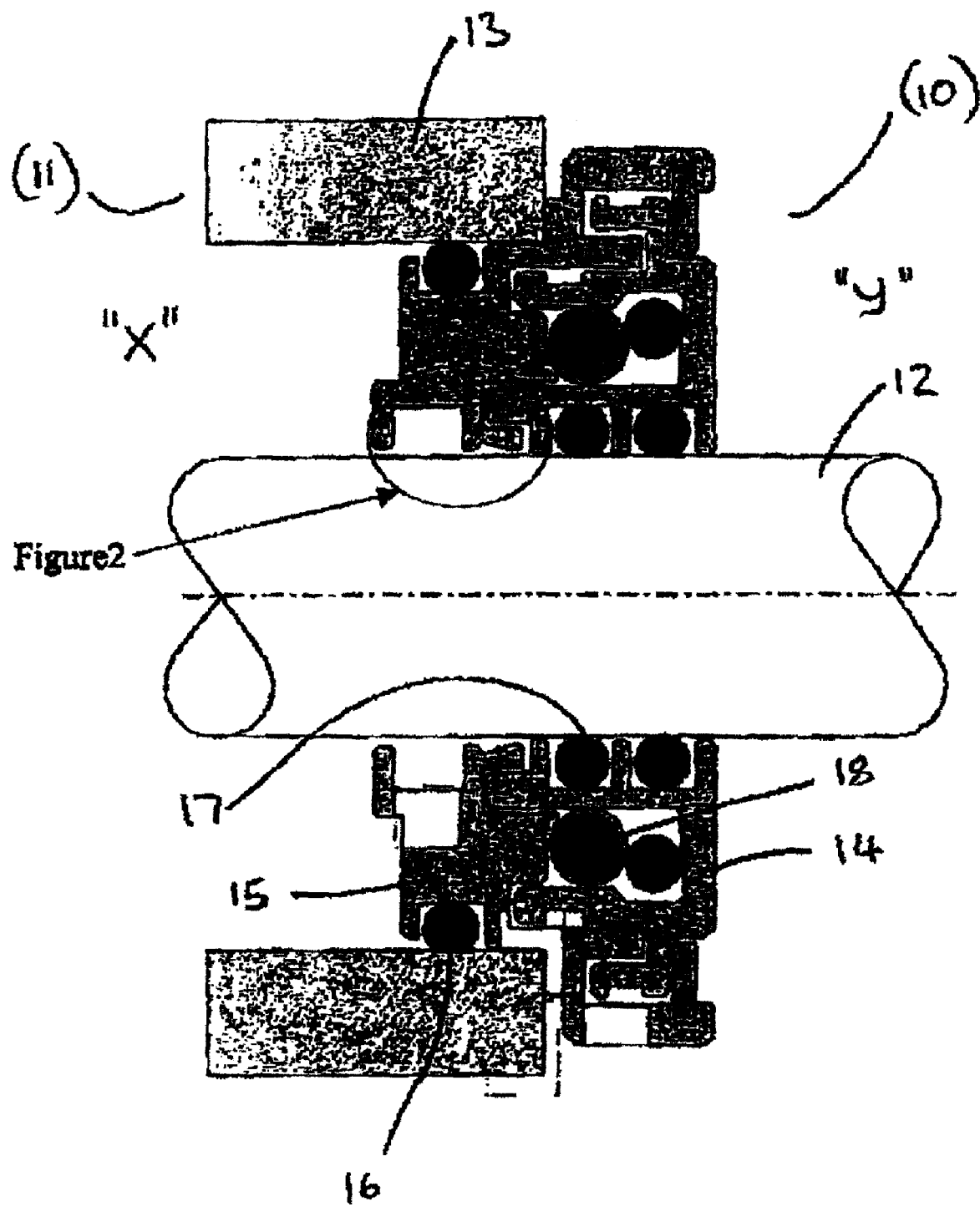
FIG. 1 is a longitudinal section of a labyrinth seal bearing protector of the invention mounted on a shaft.

Referring to FIG. 1 of the accompanying drawings, an isolator device, or bearing protector, 10 is fitted to an item of rotating equipment 11. The equipment includes a rotating shaft 12 and the stationary housing 13. The stationary housing 13 typically carried a bearing (not shown).

The area marked 'X' in FIG. 1, located at one longitudinal end of the bearing protector 10, may contain fluid and/or solids and/or foreign debris and/or atmosphere. The material in area 'X' may conveniently be referred to as 'product substance', a term used to describe either a single or a mixed medium.

Area 'Y' at the other longitudinal end of the bearing protector 10 can also contain a variety of fluids and solids, Typically, however, if this area is occupied by atmosphere. In general, the material occupying this area will be termed 'atmospheric substance' and the term is used to describe either single or mixed medium.

The bearing protector 10 comprises a rotor 14 located longitudinally adjacent to a stator 15. A deformable toroidal member, in the form of elastomeric ring 16, provides a radial seal between housing 13 and stator 15. Similarly, a further deformable toroidal member, in the form of elastomer ring 17, provides a radial seal between the shaft 12 and the rotor 14.

Static shut-off device 18, located within a roughly rectangular space defined on three sides by rotor 14 and one side by stator 15, is substantially as described in PCT patent publication No. WO 0605950A.

Figure 2:
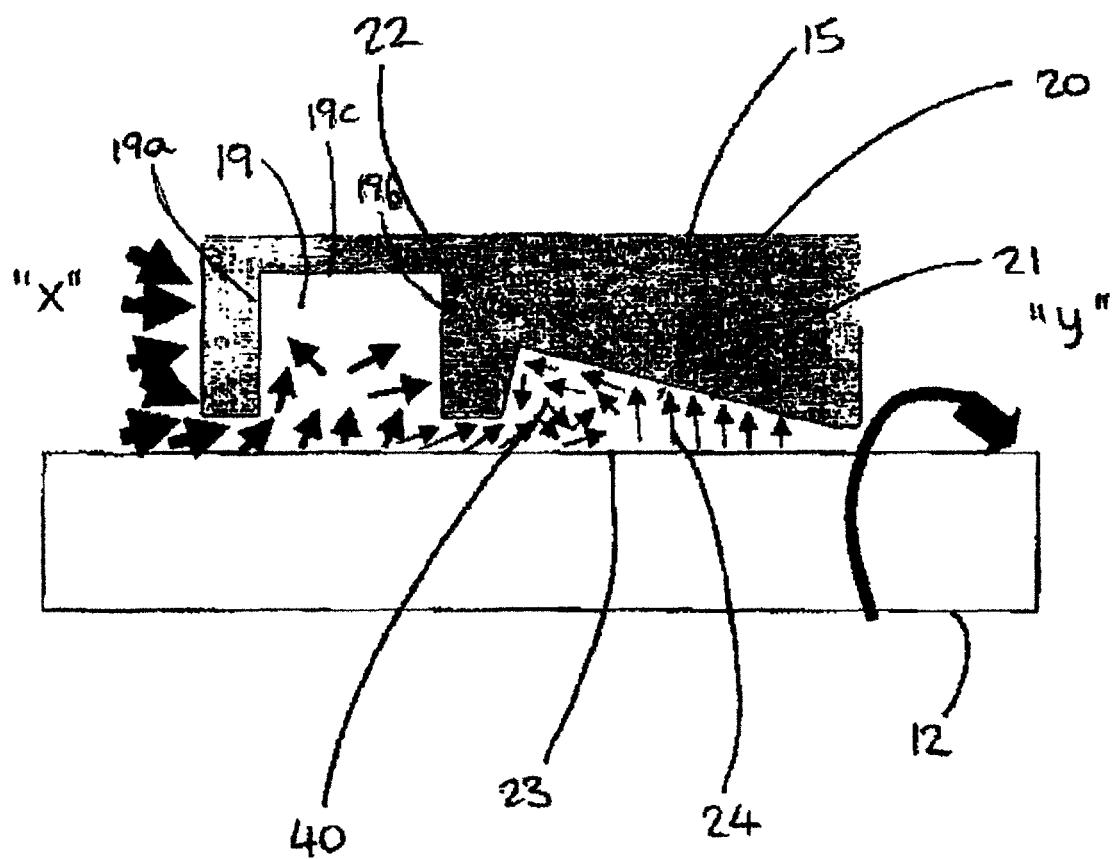
FIG. 2 shows in detail, again in longitudinal section, a part of the stator of the bearing protector of FIG. 1.

Referring now to FIG. 2 of the accompanying drawings, there is depicted detail of that part of stator 15 which lies adjacent to the shaft 12. The stator in this region includes an annular groove 19 defined by radial walls 19a and 19b and inter-connecting circumferential wall 19c. Groove 19 acts to reduce the velocity of fluid, which may be a single or mixed medium as mentioned above, entering the gap between stator 15 and shaft 12 from area 'X'. In FIG. 2 the size of the arrows indicates the velocity of flow and it will be seen that, within groove 19 and between groove 19 and shaft 12, the velocity is substantially reduced.

Located adjacent to 19, and downstream thereof, is an annular recess 20 which is substantially wedge-shaped in longitudinal section. The depth of recess 20 decreases gradually, from its maximum depth, in the direction, from area 'X' and 'Y' which is the direction of flow of the fluid. The wedge-shaped longitudinal section of recess 20 is made up of a gently inclined (to the longitudinal axis) annular surface 21 and a much more steeply inclined surface 22 providing a shoulder to the recess.

The gently inclined surface 21 may be inclined at any angle between 1° and 45° to the shaft axis. Preferably, the angle of inclination to the shaft axis is from 15° to 30°, but more preferably 20°.

The more steeply inclined surface 22 is preferably inclined at an angle to the shaft axis of from 90 to 45°, preferably 60 to 80°, and more preferably 75°.

Accordingly, while the equipment is in operation, with shaft 12 rotating in the direction shown by the arrow partly encircling the shaft, the fluid 24 is subjected to centrifugal forces which propel it towards the surface 21 of recess 20. Closer to the steeply inclined surface 22 the fluid may be caused to carry out a somewhat circular motion as indicated by the arrows in that region. The effect of recess 20 is to hinder fluid flow from region 'X' and region 'Y' with the result that the amount of fluid entering region 'Y' is substantially reduced or even eliminated. As described, with reference to the FIGS. 1 and 2 embodiment, the inclined surface 21 of the stator is adjacent and substantially facing the rotor surface, namely, that of the shaft 12. In this case the rotor surface extends parallel to the shaft axis. In another embodiment of the present invention, the rotor surface may also be inclined, effectively reducing the angle between the converging surfaces of the stator and the rotor.

As indicated above the radial distance between the rotating surface 23 (shaft 12) and the inclined stator surface 20 preferably increases in a direction towards the fluid entry source. In this way, the fluid tends to be returned back to that source.

By having surface 22 very steeply angled (it may be perpendicular to the longitudinal axis), the longitudinally travelling fluid is thrown radially inwardly against the shaft 12 at the position where the centrifugal forces are at their lowest magnitude. This position typically coincides with that of maximum depth of the recess 20.

Although the exact movement of the fluid within recess 20 will depend on a number of factors, it may be that in a certain situation so called standing vortices 40 are created adjacent to surface 22. These vortices 40 can be described as swirling, spiral movements of fluid within the recess. Vortices 40 provide a longitudinal fluid area, helping to prevent longitudinal movement of fluid in a direction away from the fluid source.

Figure 3:
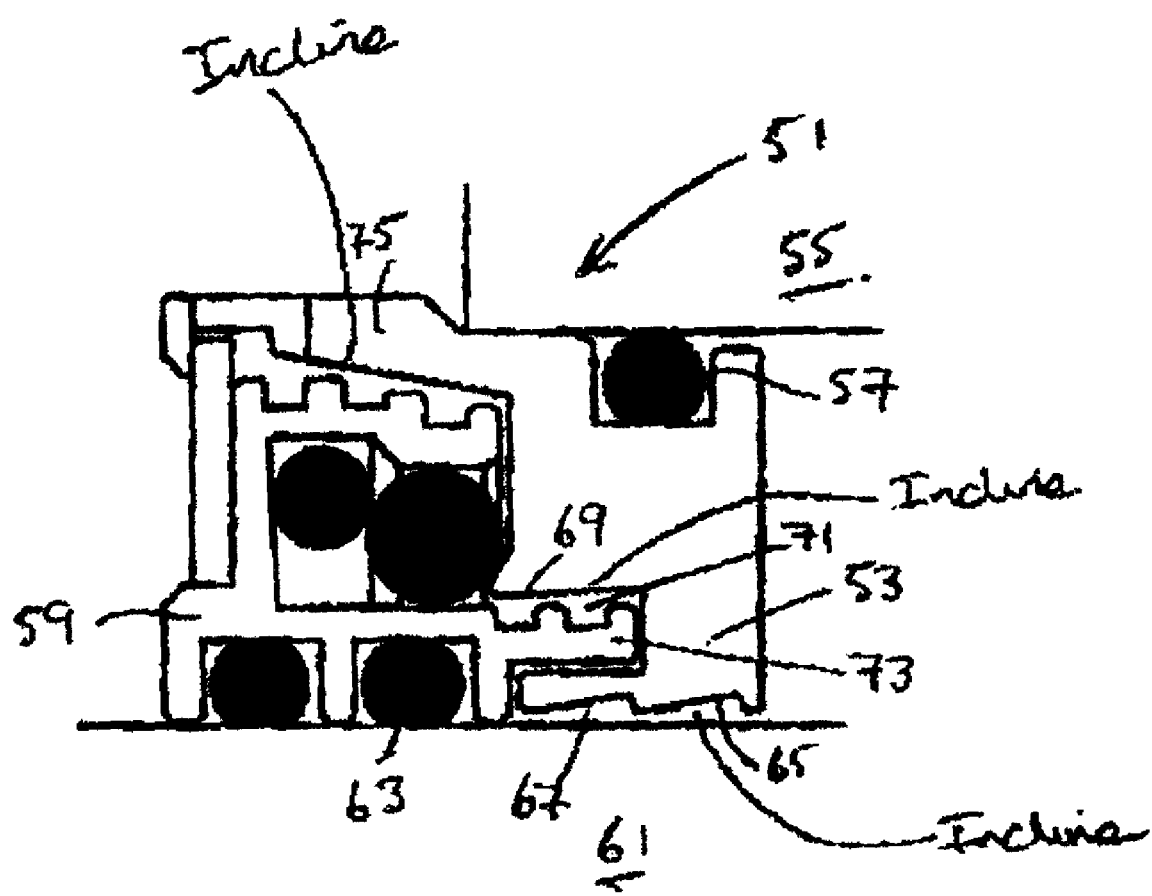
FIG. 3 is a longitudinal section of another labyrinth seal bearing protector of the invention mounted on a shaft.

Referring now to FIG. 3 of the accompanying drawings a second embodiment of a bearing protector 51, in accordance with the present invention, includes a stator 53, sealed to equipment housing 55 by elastomer ring 57, and a rotor 59, sealing to shaft 61 by elastomer ring 63.

In this case, the stator is provided with a plurality of inclined surfaces located adjacent to rotor component. A first longitudinally adjacent pair of said surfaces 65 and 67 is provided adjacent to shaft 61. A further inclined surface 69 forms part of a recess 71, which accommodates a castellated (in cross section) arm 73 of rotor 50. In this case the angle of inclination of surface 69 to the longitudinal axis is very low.

A further inclined surface is provided on arm 75 of stator 53 and this surfaces lies adjacent to the outer (again castellated) surface of rotor 59.

All these arrangements of inclined surfaces act to inhibit flow (in one direction or the other) from one side of bearing protector 51 to the other side.

Referring to FIGS. 4 to 6 of the accompanying drawings, there is illustrated embodiments of the present invention in which the fluid flow inhibiting component is provided by a recess 81 which may be seen as a modification of recess 19 of the FIG. 2 embodiment whether alone or together with other flow inhibiting entities such as recess 20 in the FIG. 2 embodiment.

The recesses depicted in FIGS. 4 to 6 are substantially three-sided having a base 83 and end walls 85 and 87. In the FIGS. 4 and 5 embodiments, the end walls 85 and 87 are oppositely inclined to the radial plane such that the mouth of the recess is of shorter longitudinal length than that the base 83.

In the cases of the FIGS. 5 and 6 embodiments, the recess 81 is provided with an integral, radially extending rib which is located substantially centrally within base 83.

As illustrated, particularly in FIGS. 4 and 5, the various edges of the recess, those between the base 83 and the end walls 85 and 87 and those at the mouth of the recess, are rounded.

The radially extending walls of rib 89 are, as illustrated in FIGS. 5 and 6, gently curved in a direction radially outwardly form the ends of the rib.

The shapes of the recesses in FIGS. 4 to 6 are such as to promote fluid movement within the recess which tends to oppose the longitudinal fluid flow, indicated by arrows 91 and 93 within the device. The fluid flow within the recesses may be as indicated by the arrows 95 which indicate the creation of vortices. However, it should be understood that the actual fluid movement within the recesses may be of a different nature, but nonetheless hindering the main longitudinal flow.

In general, rotary seals in accordance with the present invention may be used not only in the case where the shaft is a rotary member and the housing is a stationary member but also the reverse situation, that is to say, in which the shaft is stationary and the housing is rotary.

Furthermore, the invention may be embodied in both rotary and stationary arrangements of cartridge and component seals with metallic components as well as non-metallic components.

What is claimed is:

1. An isolator device for use in hindering fluid flow between components which are rotating relatively to each other about a longitudinal axis, said flow being in a first direction parallel to said axis, the isolator device comprising a stator for securing to a relatively fixed one of said components and a rotor for securing to a relatively rotating one of said components, the stator having a surface extending longitudinally and adjacent to a surface of a component which rotates relative to said stator, the fluid flow being between said surfaces, the stator having an annular recess in said surface of said stator with said annular recess defined by a first inclined surface inclined at an angle to the longitudinal axis of from 15° to 30° and a second inclined surface forming a terminal end wall for said annular recess extending to a maximum depth of said annular recess at an angle to the longitudinal axis of from 80° to 60°, wherein the first inclined surface is downstream of the second inclined surface is a repelling fluid flow side, the first inclined surface sloping from the downstream side, radially outwardly, to the upstream side, so that the fluid flow entering said annual recess strikes the second inclined surface and is directed, or repelled, backward toward the upstream side, said annular recess being shaped for promoting fluid flow within said annular recess in a second direction, said second direction opposing said first direction, said stator further including a velocity reducing groove adjacent to said annular grove and defined by a pair of radial walls and an interconnecting circumferential wall.

2. An isolator device according to claim 1, wherein the annular recess is non-rectangular in longitudinal section.

3. An isolator device according to claim 1, wherein the depth of the annular recess decreases gradually in the direction of flow in said first direction.

4. An isolator device according to claim 1, wherein the velocity reducing groove is situated upstream of the annular recess.

5. An isolator device according to claim 1, wherein the stator is provided with a deformable toroidal member which seals said stator to a relatively fixed one of said components.

6. An isolator device according to claim 1, wherein the rotor is provided with a deformable toroidal member to seal said rotor to a relatively rotating one of said components.

* * * * *